Figure 1:
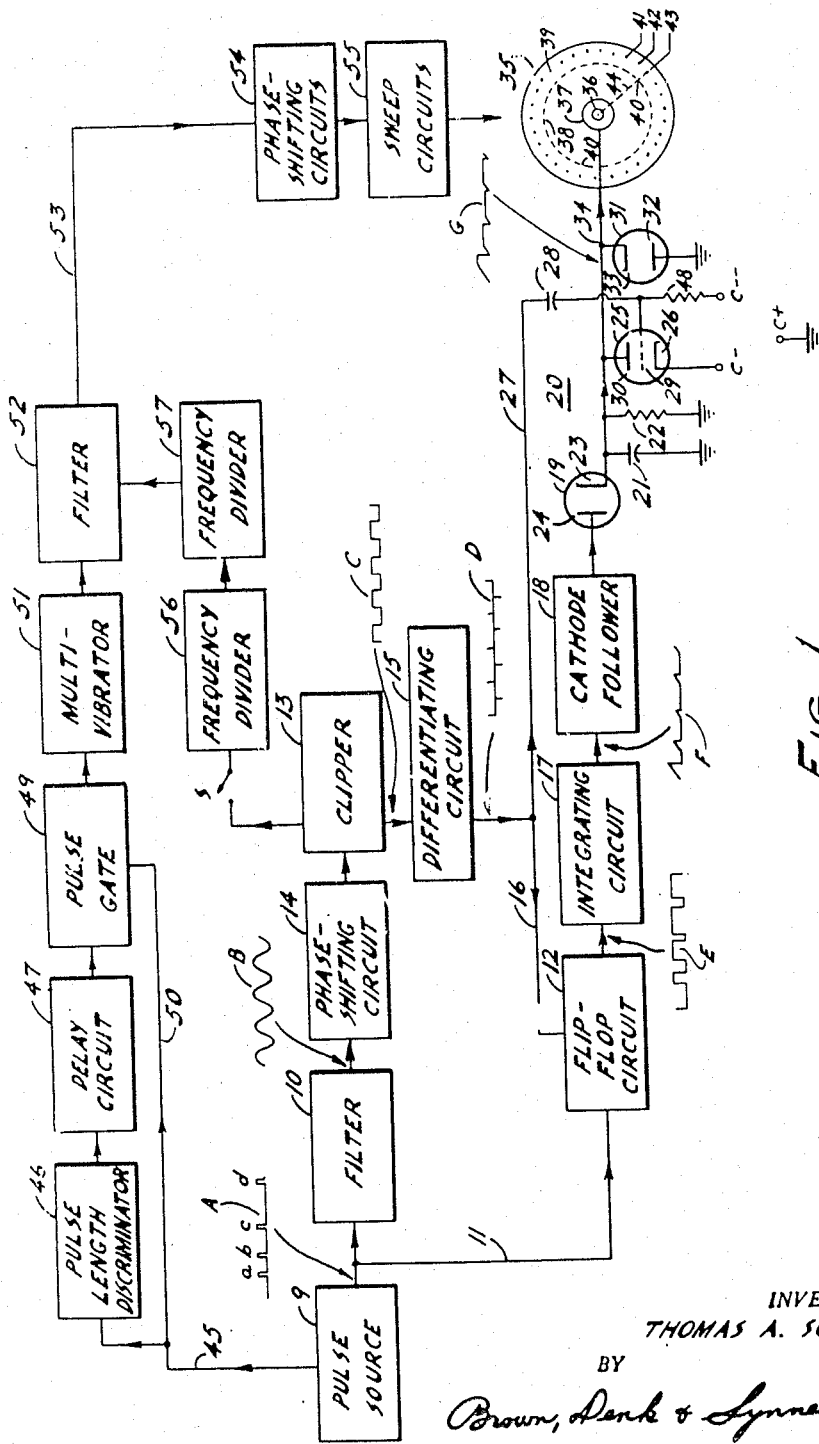

Patented Mar. 7, 1950

2,499,534

UNITED STATES PATENT OFFICE 2,499,534

RECEIVING CIRCUIT OF MULTICHANNEL PULSE-POSITION-MODULATION SYSTEMS

Thomas A. Sorber, Philadelphia, Pa., assignor to Philco Corporation, Philadelphia, Pa., a corporation of Pennsylvania Application December 28, 1946, Serial No. 719,031

4 Claims. (Cl. 179—15)

The invention herein described and claimed relates to multi-channel microwave signalling systems employing time-spaced pulses.

In multi-channel microwave signalling systems of the type referred to, a series of successive pulses is transmitted in sequence, and the series is repeated many times per second. Each of the pulses of the sequential series is a component of a different signal wave. The pulses are of substantially equal amplitude and may be position modulated, or may be pulse-length modulated within a corresponding series of sequential channels of equal time duration. At the receiving end, means are provided for sorting the pulses of the sequential series into circuits identified with individual signal waves. In most systems of which I have knowledge, the sorting is performed after the pulses have been converted from position-modulated or pulse-length-modulated pulses into amplitude-modulated signals. The present invention provides improved means for accomplishing sorting in such a receiving system.

In the copending application of Wilson P. Boothroyd filed January 16, 1947, Serial No. 722,357, assigned to Philco Corporation, an improved receiving system is described which is adapted for use in a multi-channel pulse-position-modulation system. In a preferred embodiment of the Boothroyd receiving system, incoming position-modulated pulses are converted into pulse-length-modulated pulses and then, as by means of an integrating circuit, into amplitude-modulated signals whose peak amplitudes occur at irregularly spaced intervals. Sorting of the irregularly spaced amplitude-modulated signals may be accomplished by various means, but the means which I have conceived, which is the subject matter of this invention is superior to the others, and represents a decided improvement thereover.

It is accordingly an object of this invention to provide means for sorting sequential amplitude-modulated signals occurring at irregularly spaced intervals into individual circuits, the sequential signals being components of different signal waves.

It is another object of this invention to provide means whereby irregularly spaced sequential amplitude-modulated signals are caused to be extant at regularly spaced times.

It is a more specific object of this invention to provide means whereby sequential amplitude-modulated signals, which attain individual peak amplitudes at various relative times within sequential time channels, are stored at peak value until the ends of the time channels.

Figure 2:
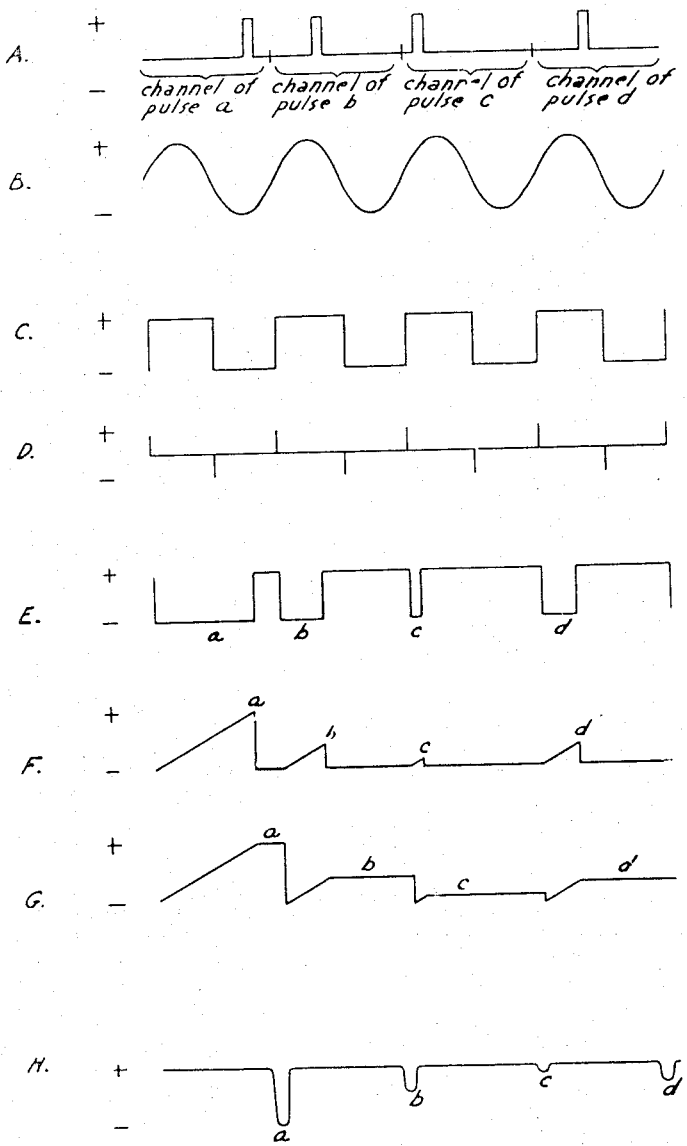

These and other objects, advantages and features of the present invention will become clear from a consideration of the following detailed description of a specific embodiment and of the accompanying drawings in which:

Figure 1 is an illustration, partly diagrammatic, partly schematic, of a circuit employing the invention; and Figure 2 is a diagram which will be helpful in understanding the invention.

Referring now to Figure 1, there is shown a source 9 of signal wave A comprised of time-spaced position-modulated pulses $a$, $b$, $c$ and $d$. The spacings between these pulses vary in accordance with the audio modulation but the amplitudes of the pulses are equal and they are all of like polarity.

For the purpose of facilitating discussion of the present invention it will be assumed that the circuit shown in Figure 1 is employed in a multi-channel pulse-position-modulation system and that signal wave A from source 9 is representative of a sequential series of thirty successive positive pulses which is repeated at an 8 kc. rate, each of the pulses of the sequential series being a sampled part of a different signal wave.

Signal wave A is applied by way of conductor 11 to a direct-coupled multivibrator circuit 12 having two stable conditions in either of which the circuit is in equilibrium, such circuits being commonly referred to as flip-flop circuits. Flip-flop circuits are known in the art, and the purpose of flip-flop circuit 12 in the receiving system now being described will become clear as the description proceeds.

In Figure 1, signal wave A is also applied to a filter circuit 10, tuned to the average repetition frequency of the pulses delivered by source 9. In the present illustration, the average pulse-repetition frequency is 240 kc., (i. e. 30×8 kc.) and the 240 kc. sine wave voltage B, shown in Figures 1 and 2, is obtained from the signal wave A by means of the tuned filter circuit 10.

Sine wave voltage B delivered by filter 10 is applied to clipper 13 through a phase-shifting circuit 14. The function of circuit 14 is to provide a manual adjustment by means of which the phase of the 240 kc. sine wave B may be adjusted, for purposes that will become clear. Circuit 14 may comprise any suitable form of phase-shifting circuit as, for example, a conventional R-C or R-L type of circuit.

Clipper 13 may comprise a double-diode limiter circuit, or any other form of limiter circuit suitable for converting the 240 kc. sine wave voltage into the square wave voltage depicted in Figures 1 and 2 by waveform C.

Square wave voltage C is applied to voltage differentiating circuit 15 and is therein differentiated to produce the unit pulses depicted in Figures 1 and 2 by waveform D. These unit pulses are commonly referred to as pips or spikes. The occurrence of the positive spikes of waveform D is coincident with the leading edges of the positive pulses of square wave C, as is clearly shown in Figure 2. By properly phasing the sine wave B, as by means of phase-shifting circuit 14, the positive spikes of waveform D may be used to mark the beginnings of the individual time channels; and in the operation of the circuit of Figure 1, the positive spikes of wave D are utilized as channel markers in a manner to be described. In the present illustration, the positive spikes are 4.16 µs apart (i. e. one sec./240 kc.) and each channel is 4.16 µs wide.

The spikes from differentiating circuit 15 are applied by way of conductor 16 to flip-flop circuit 12. In the operation of the circuit of Figure 1, flip-flop circuit 12 is employed in such manner that a positive spike from differentiating circuit 15, arriving at circuit 12 by way of conductor 16, is effective to develop, substantially instantaneously, a negative voltage across the output impedance of the flip-flop circuit; and this negative potential is maintained at a substantially constant level until the leading edge of a positive pulse from source 9 arrives at flip-flop circuit 12 by way of conductor 11, at which time the negative potential across the output impedance of the flip-flop circuit is suddenly removed. The wave shape of the voltage developed across the output impedance of flip-flop circuit 12 is consequently that of a series of negative pulses whose leading edges are coincident with the beginnings of the individual time channels and whose trailing edges are coincident with the time of arrival of the positive pulses from source 9. In other words, flip-flop circuit 12 delivers negative pulses which are length modulated in conformity with the pulse-position modulation of signal wave A. The pulse-length-modulated pulses delivered by flip-flop circuit 12 are depicted in Figures 1 and 2 as waveform E. It will be observed that the longer negative pulses of waveform E are produced by the position-modulated pulses of signal wave A which occur later in the channel period.

The pulse-length modulated pulses of waveform E are applied to an integrating circuit 17 which functions to convert pulse-length-modulated waveform E into a series of positive amplitude-modulated signals having the shape indicated by waveform F in Figures 1 and 2. It will be observed that the positive signals are built up at a substantially constant rate and that the peak amplitudes of waveform F occur at irregularly spaced times; the smaller the amplitude the earlier the peak is reached.

The circuit thus far described is shown and described in greater detail in the copending application of W. P. Boothroyd previously cited.

In accordance with my invention, improved means are provided for accomplishing segregation of the irregularly spaced amplitude-modulated signals of waveform F into individual-channel circuits. As shown in Figure 1, the signals of waveform F are applied, by way of an impedance-matching cathode-loaded circuit 18, to a diode 19 whose output network 20 is comprised of a capacitor 21 and a resistor 22. The value of resistor 22 is very high and the value of capacitor 21 is large enough to make the RC time constant of network 20 long in comparison with the time elapsing between channel markers, i. e. long in comparison with the width of the individual channels. If desired, resistor 22 may be completely omitted from the circuit, in which case the time constant of capacitor 21 is extremely long irrespective of the value of the capacitor. An extremely long time constant is not disadvantageous, however, as will become clear as the description proceeds.

As the rising positive voltage of an amplitude-modulated signal of waveform F is applied to diode 19 by way of cathode-follower circuit 18, a corresponding positive voltage is built up across capacitor 21 of output circuit 20, for cathode 23 of diode 19 follows the rising positive voltage of the signal impressed upon plate 24. In the absence of means for discharging capacitor 21, the voltage thereacross would represent the peak value of the signal of greatest amplitude applied to diode 19. For the purpose of discharging capacitor 21 at periodic intervals, there is connected across output network 20 a triode 25 whose cathode 26 is returned to a point (C—) the potential of which is somewhat below ground potential. Triode 25 is normally biased to cut-off, as by means of a negative bias (C—), applied to control grid 29 by way of resistor 48.

The positive spikes of voltage waveform D developed by differentiating circuit 15, which, as previously described, mark the beginning of the channel periods, are applied by way of conductor 27 and coupling capacitor 28 to grid 29 of triode 25 with the result that triode 25 conducts momentarily each time a positive spike arrives at grid 29. In other words, triode 25 conducts momentarily at the beginning of each channel period.

During the momentary conduction of triode 25, i. e. for the duration of each positive spike of waveform D, the plate resistance of triode 25 drops to a very low value and capacitor 21 discharges rapidly through the triode to ground. In this action, the positive potential of plate 30 of triode 25 drops toward the negative potential (C—) of cathode 26. To prevent plate 30, and hence capacitor 21, from dropping below ground potential a diode leveler tube 31 may be connected across triode 25, plate 32 of the diode 31 being connected to ground and the cathode 33 being connected to plate 30 of triode 25. It will be seen that if plate 30 of triode 25 tends to drop below ground potential cathode 33 will tend to do likewise and diode 31 will thereupon conduct, thus limiting the negative-potential excursion of conductor 34 to a negligible quantity.

The voltages developed across capacitor 21 take the form depicted as waveform G in Figures 1 and 2. By comparing waveform G with waveform F, the effect of the action of diode 19, long-hold network 20, triode 25 and diode 31 may be clearly seen. In waveform F the rising positive voltage is seen to drop sharply to ground potential coincident with the arrival of a signal pulse from source 9 at flip-flop circuit 12. In waveform G, however, the effect of the long hold circuit arrangement comprising diodes 19 and 31, network 20 and triode 25 is clearly depicted. The positive voltage across capacitor 21 is not discharged upon the arrival of a signal pulse from source 9 but is maintained by the action of network 20 awaiting arrival of a positive spike from differentiating circuit 15. Upon arrival of such positive spike at grid 22 of triode 25, capacitor 21 discharges rapidly.

Observe that the peak amplitude of each signal of waveform G is extant in each channel just prior to the end of the channel period. Since the end of the channel period occurs at regularly spaced times, the peak amplitude of each successive signal exists at regularly spaced times, and segregation of the signals into individual-channel circuits in sequence may now be readily achieved, as, for example, by means of a radial beam tube. Radial beam tubes of the type required are known in the art and a brief description thereof will suffice.

In Figure 1, radial beam tube 35 is schematically shown to comprise a cathode 36, a control grid 37, a screening element 38, and a multiplicity of anodes 39. A suppressor grid (not shown) is ordinarily included in the tube structure. Cathode 36 is cylindrical and is positioned vertically in the center of the tube. Control grid 37 is a cylindrical mesh structure closely surrounding cathode 36. Beyond control grid 37 is a multi-segment cylindrical screening element 38 having a plurality of narrow apertures or windows 40. Immediately behind each aperture is an anode 39. In the thirty-channel system being described, radial beam tube 35 would have thirty apertures and thirty mutually-insulated anodes. Each anode is connected to one of the individual-channel audio circuits, as by means of a conductor. Only three conductors 41, 42 and 43 are shown in the drawing but these are intended to be representative of the thirty conductors which would be required in the thirty-channel system being described.

Electron beam 44 is a single beam, focused and rotated in known manner by known means, as by the application of rotating magnetic and electrostatic fields. Suitable means for producing and focusing single beam 44, and for effecting rotation thereof, are described in an article by A. M. Skellett entitled "The magnetically focused radial beam vacuum tube" published in the Bell System Technical Journal, April 1944, volume XXIII, No. 2, pages 190–202. The structure of radial beam tube 35 shown schematically in Figure 1 and briefly described above may, if desired, be similar to the radial beam tube which is fully described in the article just cited.

Electron beam 44 is rotated at a speed of 8000 R. P. S. and its rotation is synchronized with the occurrence of the individual channels of the multi-channel system by means which are illustrated diagrammatically in Figure 1 and which will now be described. To facilitate description of the synchronizing means illustrated, assume that twenty-nine of the channels carry message intelligence in the form of position-modulated pulses of 0.5 μs duration each, and the thirtieth channel carries a synchronizing pulse of 3 μs duration. The position-modulated signals from source 9 are applied by way of conductor 45 to pulse-length discriminator 46 (upper left-hand portion of Fig. 1) which passes only the 3 μs synchronizing pulses and suppresses all the 0.5 μs message intelligence pulses. The synchronizing pulse is then applied to a delay circuit 47 which is arranged, in the present illustration, to deliver an output pulse 124 μs after the application of the synchronizing pulse. If desired, delay circuit 47 may be similar to the circuit shown and described in the copending application of Robert C. Moore, entitled "Pulse delay system," filed April 29, 1944, Serial No. 533,385, now U. S. Patent No. 2,479,954, granted August 23, 1949, assigned to Philco Corporation. The delay introduced by circuit 47 between the applied synchronizing pulse and the output pulse is equal to almost one cycle of the 8 kc. frequency, i. e. to almost the length of the synchronizing-pulse repetition period. The delayed pulse from circuit 47 is then applied to pulse gate 49 to open the gate for the succeeding synchronizing pulse which is applied directly to pulse gate 49 by way of conductor 50. Conductor 50 carries message intelligence as well as synchronizing pulses, but only the synchronizing pulses pass through pulse gate 49 since the gate is closed except at synchronizing-pulse time.

The synchronizing pulses pass through gate 49 at a frequency of 8 kc. and are used to synchronize the multivibrator 51 at its fundamental frequency. Multivibrator 51 delivers an 8 kc. square wave which is applied to filter 52 to obtain an 8 kc. sine wave and the 8 kc. sine wave is then applied as by way of conductor 53 and phase shifting circuits 54 to sweep circuits 55 of radial beam tube 35. The function of sweep circuits 55 is to produce rotating magnetic and electrostatic fields whereby rotation of beam 44 at 8000 R. P. S. is effected. Sweep circuits 55 may be of any suitable type and if desired may be similar to those described in U. S. Patent No. 2,217,774, issued October 15, 1940, to A. M. Skellett.

The function of phase-shifting circuits 54 is to provide a manual adjustment whereby the rotating movement of beam 44 may be so synchronized with the occurrence of the individual channels of the sequential series, as defined by the individual-channel marker pulses previously referred to, that beam 44 sweeps across the anode associated with a particular channel at a time just prior to the end of the channel period.

Referring again to the schematic representation of radial beam tube 35 in Figure 1, it will be understood that, as beam 44 sweeps radially through a complete rotation, the beam electrons pass through each of the thirty apertures in sequence; and in passing through a particular aperture, the electrons impinge upon the particular anode located immediately behind that aperture. The beam electrons consequently impinge upon each of the thirty anodes in sequence. For a given speed of rotation, the duration of impingement upon each anode is determined by the width of the beam, the width of the aperture, and the width of the anode. By a proper selection of dimensions, the duration of impingement upon each anode may be made very short, as, for example, 0.5 μs, and by suitable adjustment of the phase of beam rotation, with respect to the occurrence of the time channels as defined by the individual-channel marker pulses, each anode may be impinged or scanned for 0.5 μs immediately preceding the end of the channel period associated therewith. As each anode is thus scanned, the beam intensity is modulated by the signal then existing on control grid 37 and a corresponding signal is developed in the individual-channel circuit associated with that anode. Waveform H of Figure 2 depicts the signals thus generated sequentially in the individual-channel circuits. And it will be clearly seen from waveform G that, by virtue of the action of the long hold circuit comprised of network 20, triode 25, and diodes 19 and 31, the amplitude of the signal on control grid 37 immediately preceding the end of each channel period corresponds to the time position of the pulse transmitted during that channel period.

The synchronizing means described above are suitable for use in systems in which one of the channels is allocated to the transmission of a synchronizing pulse. If desired, however, all of the channels may be assigned to the transmission of message intelligence, the transmission of a synchronizing pulse not being essential to the operation of the system. For example, the 240 kc. square wave voltage available at the output of clipper 13 may be applied, by way of switch S, to a frequency divider circuit 56 and therein reduced to say 40 kc., and then further reduced to an 8 kc. square wave by means of frequency-divider circuit 57. The output of frequency-divider circuit 57 may then be applied to filter 52 to provide the 8 kc. sine wave voltage necessary to drive beam 44 of radial beam tube 35.

I have described my improved means in the environment of a receiving system which is similar to one of the systems shown and described in the copending Boothroyd application previously cited. However, my improved means may be employed to equal advantage in other systems, as for example, in other of the systems shown in the Boothroyd application. In fact, the invention may be advantageously utilized wherever it is required to sort sequential, irregularly-spaced, amplitude-modulated signals, or wherever it is required that irregularly-spaced amplitude-modulated signals be extent at regularly spaced times.

Having described my invention, I claim:

1. In a receiver in a multi-channel system: a source of a recurrent series of sequential time-spaced signals of varying amplitudes and varying spacings, said signals belonging to different channels; means comprising a long time constant circuit for storing said signals; means for discharging said stored signals at regularly spaced intervals; means for deriving signals from said stored signals at regularly spaced intervals prior to said discharge; and means for segregating said derived signals into individual circuits.

2. In a receiver in a multi-channel system: a source of a recurrent series of sequential time-spaced signals of varying amplitudes and varying spacings, said signals belonging to different channels, said channels being of equal time period; means for storing said signals; means for discharging said stored signals at regularly spaced intervals coincident with the end of each channel period; means for deriving signals from said stored signals immediately prior to the end of each channel period; and means for segregating said derived signals into individual circuits.

3. In an electrical system: a source of successive time-spaced voltage signals of various amplitudes and various spacings; a source of successive regularly-spaced reference pulses of preselected polarity, said pulses alternating in occurrence with said signals; storage means; means for applying a first of said signals to said storage means to store a first voltage corresponding in amplitude to that of said first signal; discharge means for said storage means, said discharge means being inoperative unless actuated; means responsive to a first of said reference pulses for actuating said discharge means to discharge said first voltage from said storage means prior to the application of a second of said signals; means for applying a second of said signals to said storage means to store a second voltage corresponding in amplitude to that of said second signal; means responsive to a second of said reference pulses for actuating said discharge means to discharge said second voltage from said storage means prior to the application of a third of said signals; and means for deriving signals from said stored voltages at regularly spaced intervals.

4. In the combination claimed in claim 3, characterized in that the means for deriving signals from said stored voltages at regularly spaced intervals comprises means for deriving signals from said stored voltages immediately prior to said actuation of said discharge means.

THOMAS A. SORBER.

REFERENCES CITED

The following references are of record in the file of this patent:

UNITED STATES PATENTS

| Number | Name | Date |
| --- | --- | --- |
| 2,057,773 | Finch | Oct. 20, 1936 |
| 2,277,516 | Henroteau | Mar. 24, 1942 |
| 2,404,306 | Luck | July 16, 1946 |
| 2,416,286 | Busignies | Feb. 25, 1947 |
| 2,416,305 | Grieg | Feb. 25, 1947 |
| 2,416,330 | Labin et al. | Feb. 25, 1947 |
| 2,419,340 | Easton | Apr. 22, 1947 |